United States Patent [19]

Mehwald

[11] 4,084,087

[45] Apr. 11, 1978

[54] ANALOG APPARATUS FOR DETERMINING THE ATTITUDE ERRORS OF A THREE-AXIS STABILIZED SATELLITE

[75] Inventor: Günther R. Mehwald, Leiderdorp, Netherlands

[73] Assignee: Organisation Europeenne de Recherches Spatiales, Neuilly-sur-Seine, France

[21] Appl. No.: 687,305

[22] Filed: May 17, 1976

[30] Foreign Application Priority Data

May 16, 1975 Belgium .................................. 156436

[51] Int. Cl.$^2$ ............................................. G01V 1/20
[52] U.S. Cl. .................................. 250/203 R; 356/141
[58] Field of Search ........................... 244/3.15, 3.16; 356/141, 152; 250/203

[56] References Cited

U.S. PATENT DOCUMENTS

| | | | |
|---|---|---|---|
| 3,230,376 | 1/1966 | Goetze et al. | 250/203 |
| 3,535,521 | 10/1970 | Levine | 250/203 |
| 3,591,292 | 7/1971 | Feuchter et al. | 356/141 |
| 3,657,547 | 4/1972 | Mansfield | 356/141 |

*Primary Examiner*—David C. Nelms
*Attorney, Agent, or Firm*—Young & Thompson

[57] ABSTRACT

An apparatus to be used with a horizon sensor comprising an oscillating mirror and a plurality of bolometers on board a three-axis stabilized satellite. Means are provided to derive signals from the radiance signals produced by the bolometers and other means use said derived signals to sample the deviation signal representing the direction deviation of the optical axis of said mirror in order to produce the attitude error signals.

2 Claims, 3 Drawing Figures

ANALOG APPARATUS FOR DETERMINING THE ATTITUDE ERRORS OF A THREE-AXIS STABILIZED SATELLITE

The present invention relates to an analog apparatus for determining, from the signals generated by an infrared horizon sensor, the attitude deviations of a three-axis stabilised satellite in a geocentric orbit.

Figure 1:
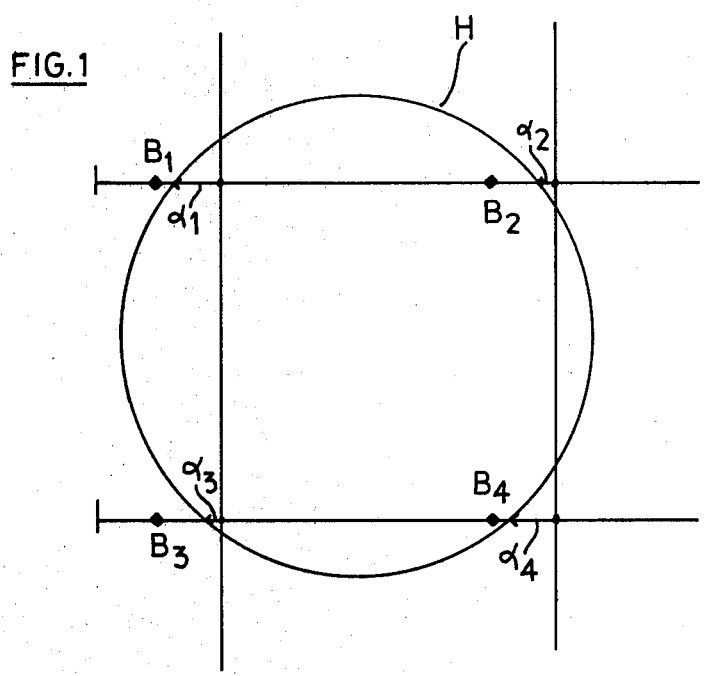

Infrared horizon sensors are widely used on board satellites to determine the instantaneous directions of their optical axis at the instant of the space-earth and earth-space transitions. An infrared horizon sensor comprises four fixed bolometers and an oscillating mirror which causes the earth image to oscillate with respect to the bolometers. Such oscillations of the earth image define four deviation angles $\alpha_1$, $\alpha_2$, $\alpha_3$ and $\alpha_4$ which determine the positions of the contour of the earth image, i.e. the earth's horizon, relative to the mean position of said horizon. These angles are indicated in FIG. 1 wherein the circle H represents the earth's horizon and the rhombs $B_1$, $B_2$, $B_3$ and $B_4$ represent the bolometers.

The attitude errors along the two orthogonal axes are defined as follows:

$$\epsilon_{p12} = k\frac{\alpha_1 + \alpha_2}{2} \qquad \epsilon_{p34} = k\frac{\alpha_3 + \alpha_4}{2}$$

$$\epsilon_{r31} = f(\alpha_3 - \alpha_1) \qquad \epsilon_{r24} = f(\alpha_2 - \alpha_4)$$

In the past digital means have been designed to detect and measure those errors. Such digital means, comprising encoders, digital counters, registers etc..., are rather sophisticated and expensive.

Analog means are also known for the same purpose as illustrated in U.S. Pat. Nos. 3,158,337, 3,191,038 and 3,038,077 for instance.

The object of the invention is to provide a new analog apparatus which is simpler than the known apparatus and which permits an offset pointing to be made with undegraded accuracy.

According to the invention there is provided an apparatus comprising first circuit means coupled to the oscillating mirror to generate a signal representing the direction deviation of the optical axis of said mirror, and a plurality of second circuit means each connected to the output of one bolometer to generate signals representing the deviation angles of the direction of said optical axis at the instant of the optical axis crossing the earth's horizon, each of said second circuit means comprising amplifier/derivator means adapted to produce a pulse at the occurrence time of each edge of the radiance signal from the bolometer, square shaping circuit means connected at the output of said derivator means and adapted to produce at two outputs thereof square wave signals of opposite polarities respectively corresponding to said pulses, and sample-and-hold circuit means having a first input connected to each output of the shaping circuit means and a second input connected to the output of said first circuit means, said sample and hold circuit means being adapted to sample the deviation signal at the instants of the optical axis crossing the earth's horizon. An analog circuit means is connected to the output of said second circuit means for combining the output signals therefrom to produce error signals.

Figure 2:
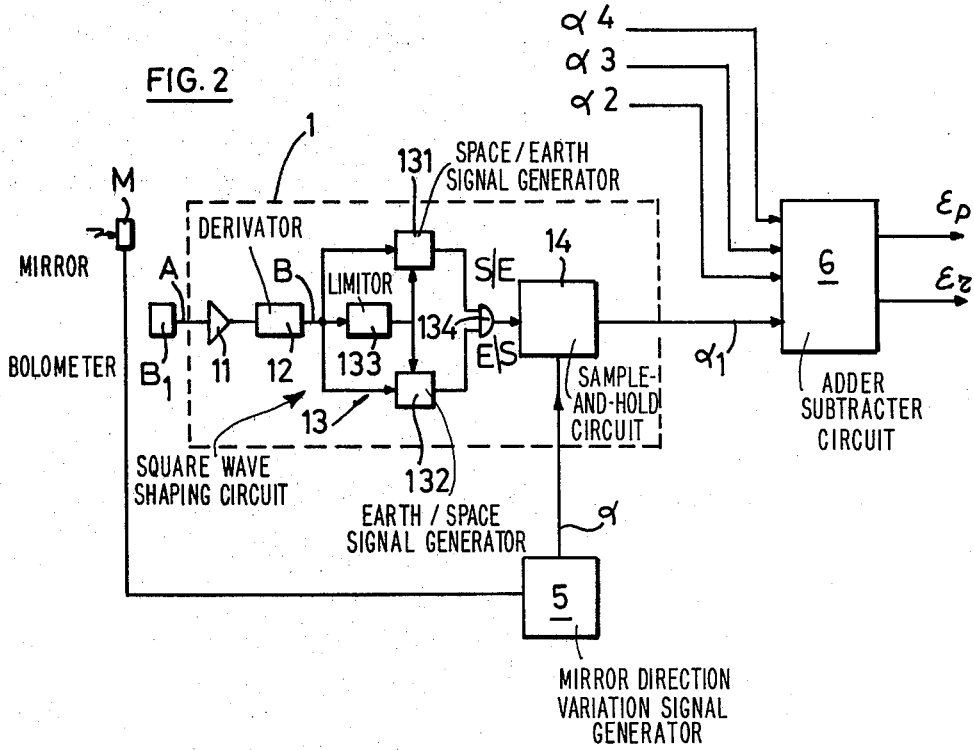
Figure 3:
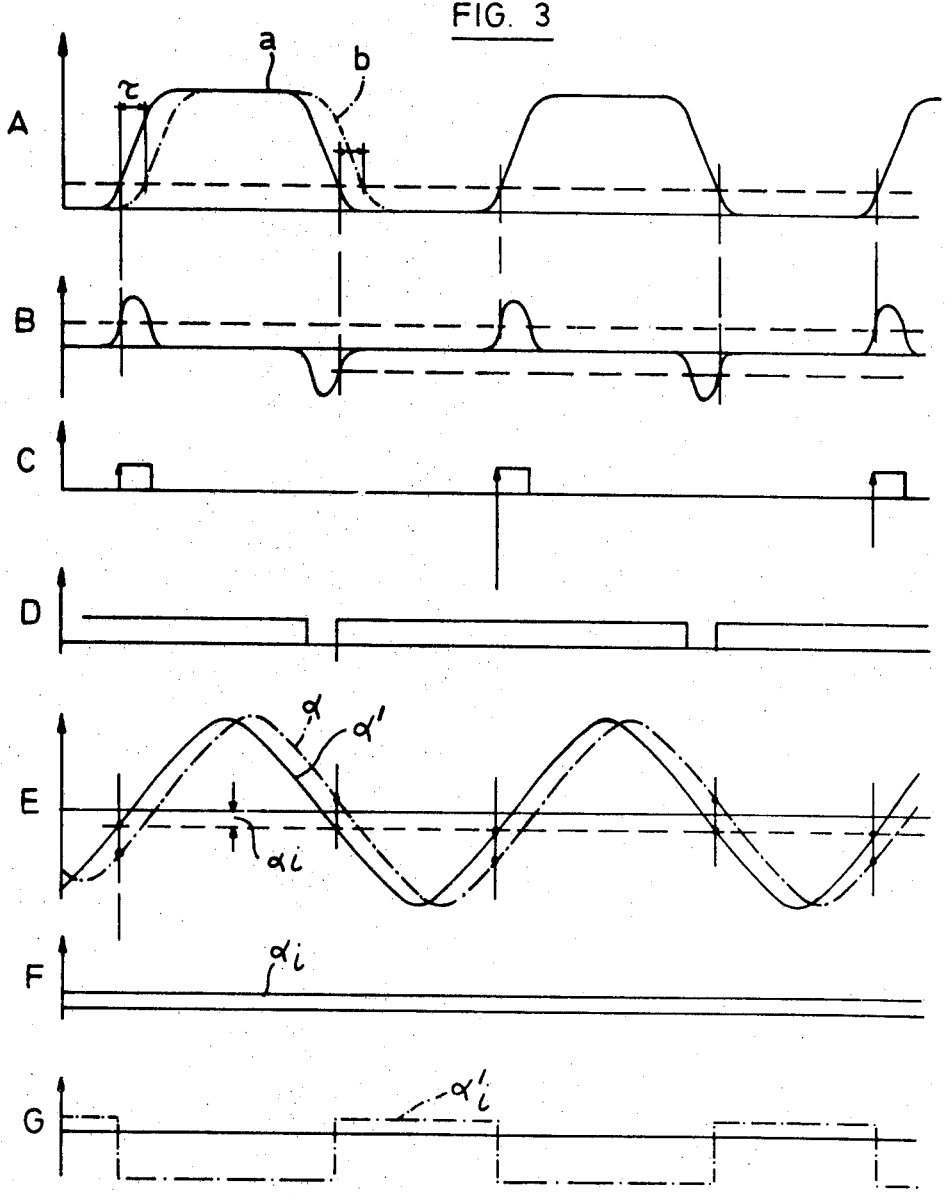

In the drawings:

FIG. 1 is a diagram showing the definition of the deviation angles of the oscillating mirror of a horizon sensor, FIG. 2 is a block diagram of an embodiment of the apparatus according to the invention, FIG. 3 is a waveform diagram illustrating the operation of the apparatus of FIG. 2.

The operation of the apparatus of the invention is based on the energy modulation of the radiated light beam from the earth as sensed by the oscillating mirror in an infrared horizon sensor. As shown in FIG. 2, the exemplary embodiment of the apparatus comprises first circuit means 5 coupled to the oscillating mirror M which is part of the infrared horizon sensor, four identical deviation angle signal generators 1, 2, 3, 4, each fed by the output signal from a respective bolometer, and adder-subtracter circuit means 6. Said first circuit means 5 is adapted to generate a signal $\alpha$ representing the direction variation of the optical axis of mirror M.

Each of the bolometers $B_1$, $B_2$, $B_3$ and $B_4$ produces a radiance signal having a waveform as shown by curve A on FIG. 3. This signal has edges which correspond to the space/earth and earth/space transitions.

After having been amplified in preamplifier 11 the radiance signal A is applied to the derivator means 12 which, as well known in the art, produces a pulse at the occurrence time of each edge of signal A: a positive pulse for a positive-going edge and a negative pulse for a negative-going edge. The generated pulses are depicted in diagram B of FIG. 3. The pulses B are applied to a square wave shaping circuit mens 13 having two outputs: one thereof provides the signals S/E corresponding to the space/earth transitions and the other provides the signals E/S corresponding to the earth/space transitions.

In the exemplary embodiment the pulses B are applied to a signal S/E generator 131, a signal E/S generator 132 and a limitor 133 adapted to produce a reference voltage for driving the switching of the generators 131 and 132.

The generators outputs provide the signals S/E and E/S respectively as illustrated by curves C and D in FIG. 3. These signals are combined in the OR-gate 134 prior to being coupled to the sample-and-hold circuit means 14 for being used therein to sample the deviation signal $\alpha$, i.e. the signal representing the direction deviation of the mirror's optical axis. An illustrative signal $\alpha$ is shown as curve E in FIG. 3.

The sample-and-hold circuit means 14 thus accepts the signals S/E and E/S as first inputs and signal $\alpha$ as second input. It may be comprised of any suitable embodiment known in the art to sample the signal $\alpha$ at the occurrence times of any positive-going transition of one or both of signals S/E and E/S and to hold the sample $\alpha_i$ until the occurrence of the next sampling time.

The outputs from generators 1, 2, 3, and 4 provide sampled signals which represent the deviation angles $\alpha_1$, $\alpha_2$, $\alpha_3$ and $\alpha_4$. With ideal bolometers which do not have any time constant, the deviation signal $\alpha$ at the sampling time actually represents the true deviation of the oscillating mirror, and only one of the transition signals, either S/E or E/S, need to be used to sample the signal $\alpha$. Practically, however, the bolometers do have a time constant, that is a lapse of time until they effectively respond to the sensed radiation. Such a time delay is represented as $\tau$ on diagram A of FIG. 3: curve (a) illustrates the signal A at the time it should have been generated i.e. the very instant when the bolometer senses the radiation, and curve (b) illustrates the signal A at the time it is effectively generated. This delay causes a sampling error to occur when one of the signals S/E and E/S is used in the sampling process inasmuch as in that case the sampling would in effect correspond to a radiance signal having a different width: a smaller width when signal S/E is used and a larger width when signal E/S is used.

In order to cancel said sampling error both signals S/E and E/S are used according to the invention such that the time delay resulting from the bolometer time constant at the instant of a S/E transition is compensated by an equal time delay at the instant of a E/S transition. The sampling then proceeds on a delayed radiance signal but without any apparent shape or width variation.

However, ripple occurs in the output signal $\alpha_i$ as shown by waveform $\alpha'_i$ in FIG. 3G. To cancel such ripple, according to the invention there is provided means for delaying the sampled signal by a lapse of time which is equal to the time constant $\tau$. The deviation signal is then as depicted by curve $\alpha$ in FIG. 3E. When the bolometers have substantially the same time constant, the ripple will be substantially canceled and the output signal $\alpha_i$ will be uniform as shown in FIG. 3F. When the bolometers have different time constants, the delay which is applied to signal $\alpha$ will be equal to the average of the bolometers time constants and the output signal $\alpha_i$ will have an insignificant ripple only.

After having been produced, the angular deviation signals $\alpha_1$, $\alpha_2$, $\alpha_3$ and $\alpha_4$ still have to be combined in order to produce the error signals $\epsilon_p$ and $\epsilon_r$ defined above. The signals $\alpha_1$ through $\alpha_4$ are applied to the analog adder-subtracter means 6 which may be embodied in any of several ways by those skilled in the art in order that the error signals are produced to permit the attitude control of the satellite.

What is claimed is:

1. An apparatus to be used with a horizon sensor comprising an oscillating mirror and $n$ fixed bolometers on board a three-axis stabilised satellite for determining the attitude deviations thereof, said apparatus comprising first circuit means coupled to the oscillating mirror to generate a signal representing the direction deviation of the optical axis of said mirror, $n$ second circuit means each connected to the output of one bolometer to generate signals representing the deviation angles of the direction of said optical axis at the instant of the optical axis crossing the earth's horizon, said second circuit means each comprising amplifier/derivator means adapted to produce a pulse at the occurrence time of each edge of the radiance signal from the bolometer, square shaping circuit means connected at the output of said derivator means and adapted to produce at two outputs thereof square wave signals of opposite polarities respectively corresponding to said pulses, and sample-and-hold circuit means having a first input connected to each output of the shaping circuit means and a second input connected to the output of said first circuit means, said sample-and-hold circuit means being adapted to sample the deviation signal at the instants of the optical axis crossing the earth's horizon, and analog circuit means connected to the output of said second circuit means for combining the output signals therefrom to produce error signals.

2. An apparatus as claimed in claim 1, wherein said first circuit means comprises delay circuit means adapted to delay the said deviation signal by a lapse of time equal to the bolometers time constants.

* * * * *